United States Patent
Burghdoff et al.

(10) Patent No.: US 9,863,367 B2
(45) Date of Patent: Jan. 9, 2018

(54) FAN NOZZLE DRIVE SYSTEMS THAT LOCK THRUST REVERSERS

(71) Applicant: THE BOEING COMPANY, Chicago, IL (US)

(72) Inventors: Michael J. Burghdoff, Everett, WA (US); Jerry Edward Farstad, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 448 days.

(21) Appl. No.: 14/070,393

(22) Filed: Nov. 1, 2013

(65) Prior Publication Data

US 2015/0122904 A1    May 7, 2015

(51) Int. Cl.
| | |
|---|---|
| *F02K 1/72* | (2006.01) |
| *F02K 1/76* | (2006.01) |
| *F02K 1/12* | (2006.01) |
| *F02K 1/62* | (2006.01) |

(52) U.S. Cl.
CPC ............ *F02K 1/766* (2013.01); *F02K 1/1207* (2013.01); *F02K 1/625* (2013.01); *F02K 1/72* (2013.01); *F02K 1/763* (2013.01); *F05D 2220/36* (2013.01); *F05D 2260/30* (2013.01); *F05D 2260/53* (2013.01); *F05D 2260/90* (2013.01); *F05D 2270/051* (2013.01)

(58) Field of Classification Search
CPC .......... F05D 2260/53; F05D 2270/051; F05D 2260/30; F05D 2220/36; F05D 2260/90; F02K 1/766; F02K 1/625; F02K 1/1207; F02K 1/72; F02K 1/763
See application file for complete search history.

(56) References Cited

U.S. PATENT DOCUMENTS

| | | | |
|---|---|---|---|
| 5,778,659 A | 7/1998 | Duesler et al. | |
| 5,806,302 A | 9/1998 | Cariola et al. | |
| 6,343,769 B1* | 2/2002 | Davies | F02K 1/766 239/265.11 |
| 7,721,551 B2* | 5/2010 | Hanson | F01D 17/141 239/265.33 |
| 2008/0105074 A1* | 5/2008 | Bristol | F02K 1/766 244/110 B |

(Continued)

FOREIGN PATENT DOCUMENTS

| | | |
|---|---|---|
| CN | 102844238 A | 12/2012 |
| EP | 2602464 A2 | 6/2013 |

OTHER PUBLICATIONS

U.S. Appl. No. 13/473,367.

(Continued)

*Primary Examiner* — Ted Kim
(74) *Attorney, Agent, or Firm* — Duft Bornsen & Fettig LLP (57) ABSTRACT

Systems and methods are provided that lock thrust reversers and also drive fan nozzles of an aircraft. One system includes a coupling configured to selectively engage and disengage. While engaged, the coupling is configured to rotate to drive a Variable Area Fan Nozzle (VAFN), at least a portion of which is on a translating portion of a thrust reverser of an aircraft. Furthermore, while engaged the coupling is configured to prevent displacement of the translating portion.

23 Claims, 7 Drawing Sheets

(56) References Cited

U.S. PATENT DOCUMENTS

| | | | |
|---|---|---|---|
| 2008/0190095 A1* | 8/2008 | Baran | F02K 1/002 60/226.3 |
| 2009/0013664 A1 | 1/2009 | Jones et al. | |
| 2010/0126139 A1* | 5/2010 | Howe | F02K 1/1207 60/226.2 |
| 2011/0030338 A1 | 2/2011 | Vauchel | |
| 2011/0192135 A1* | 8/2011 | McKay | F02K 1/763 60/226.2 |
| 2013/0008145 A1 | 1/2013 | Sundstrom et al. | |
| 2013/0020408 A1 | 1/2013 | Jasklowski et al. | |
| 2013/0062435 A1* | 3/2013 | Moradell-Casellas | B64D 29/06 239/265.37 |
| 2013/0075494 A1* | 3/2013 | Vaughan | F02K 1/72 239/265.29 |
| 2013/0312387 A1* | 11/2013 | West | F02K 1/09 60/226.2 |
| 2014/0076998 A1* | 3/2014 | Marchaj | F02K 1/76 239/265.19 |

OTHER PUBLICATIONS

Chinese Office Action dated Mar. 29, 2017.
Canadian Office Action; Application No. 2861468; dated Mar. 1, 2017.
EP Office Action; 14187251.5-1607; dated Aug. 28, 2017.

\* cited by examiner

FAN NOZZLE DRIVE SYSTEMS THAT LOCK THRUST REVERSERS

FIELD

The invention relates to the field of aircraft, and in particular, to aircraft engines.

BACKGROUND

Turbofan engines provide thrust in order to power an aircraft during takeoff, flight, and landing. Some turbofan engines utilize Variable-Area Fan Nozzle (VAFN) systems in order to alter how they generate thrust. Specifically, a VAFN dynamically adjusts the shape of the output nozzle for the turbofan engine, resulting in numerous benefits such as increased fuel economy and noise reduction.

Another system used for turbofan engines is known as a thrust reverser. A thrust reverser redirects the output of the engine towards the fore of the aircraft instead of the aft of the aircraft. Thrust reversers may be used, for example, to reduce the speed of an aircraft after landing. One type of thrust reverser is a translating sleeve fan-air thrust reverser. In these thrust reversers, a translating cowl ("transcowl") of a nacelle that houses the engine slides aftwards, allowing fan air to be rerouted as it travels through the engine. It is generally not desirable to use thrust reversers during flight. For this reason, thrust reversers are often locked in a closed position while the aircraft is in flight.

SUMMARY

Embodiments described herein utilize a coupling that may selectively engage in order to prevent a translating portion of a thrust reverser from moving. While engaged, the coupling is also capable of rotating to drive a VAFN on the translating portion. While disengaged, the coupling allows the translating portion to move. This means that the coupling can serve as both a drive for the VAFN and a locking mechanism for the thrust reverser.

One embodiment is a system that includes a first coupling member attached to a first structure proximate to a thrust reverser of an aircraft, and a second coupling member attached to a translating portion of the thrust reverser. The translating portion is configured to move relative to the first portion. The first coupling member and the second coupling member are able to engage to prevent movement of the translating portion, and the second coupling member is able to transmit rotation from the first coupling member to an actuator to drive at least a portion of a Variable Area Fan Nozzle (VAFN) located on the translating portion.

Another embodiment is a system that includes a coupling that is able to selectively engage and disengage. While engaged, the coupling is configured to rotate to drive a Variable Area Fan Nozzle (VAFN), at least a portion of which is on a translating portion of a thrust reverser of an aircraft. Furthermore, while engaged the coupling is configured to prevent displacement of the translating portion.

Another embodiment is a method of operating a Variable Area Fan Nozzle (VAFN) located on a transcowl of an aircraft. The method includes closing a transcowl of a thrust reverser of an aircraft, and engaging a coupling to lock the transcowl in a closed position. The transcowl includes a movable petal of a VAFN. The method further includes rotating the coupling to move the movable petal.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present invention are now described, by way of example only, and with reference to the accompanying drawings. The same reference number represents the same element or the same type of element on all drawings.

DESCRIPTION

The figures and the following description illustrate specific examples of the present disclosure. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
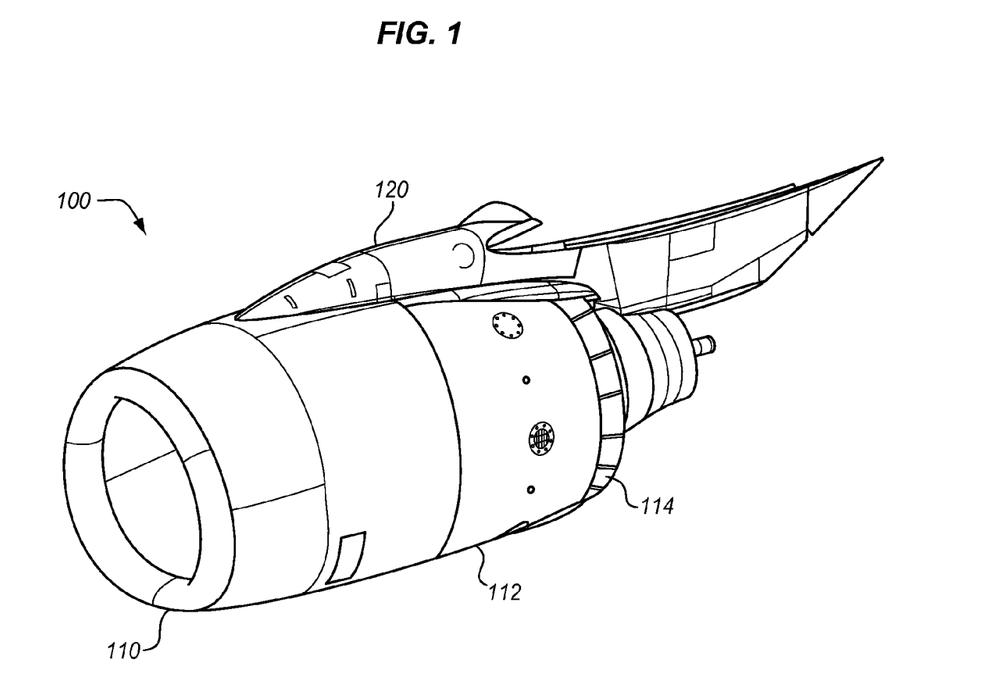
FIG. 1 is a perspective view of an engine nacelle mounted to a wing pylon in one example of the present disclosure.

FIG. 1 is a perspective view 100 of an engine nacelle 110 mounted to a wing pylon 120 of an aircraft according to one embodiment of the present disclosure. Engine nacelle 110 houses an aircraft engine (e.g., a turbofan engine) used to provide thrust during takeoff, flight, and landing. Engine nacelle 110 includes a fan-air Thrust Reversal Actuation System (TRAS) for a thrust reverser, and a Variable Area Fan Nozzle (VAFN) 114. VAFN 114 is integrated into the translating sleeve (a.k.a., "transcowl") 112 of the thrust reverser, and therefore moves when transcowl 112 moves.

Engine nacelle 110 has been enhanced with a multipurpose disengageable coupling. While engaged, such a disengageable coupling locks transcowl 112 into a closed position, while also being able to transmit mechanical rotation to components of transcowl 112 in order to actuate VAFN 114. Details of a coupling according to some examples herein are described with regard to FIGS. 2-5 below.

Figure 2:
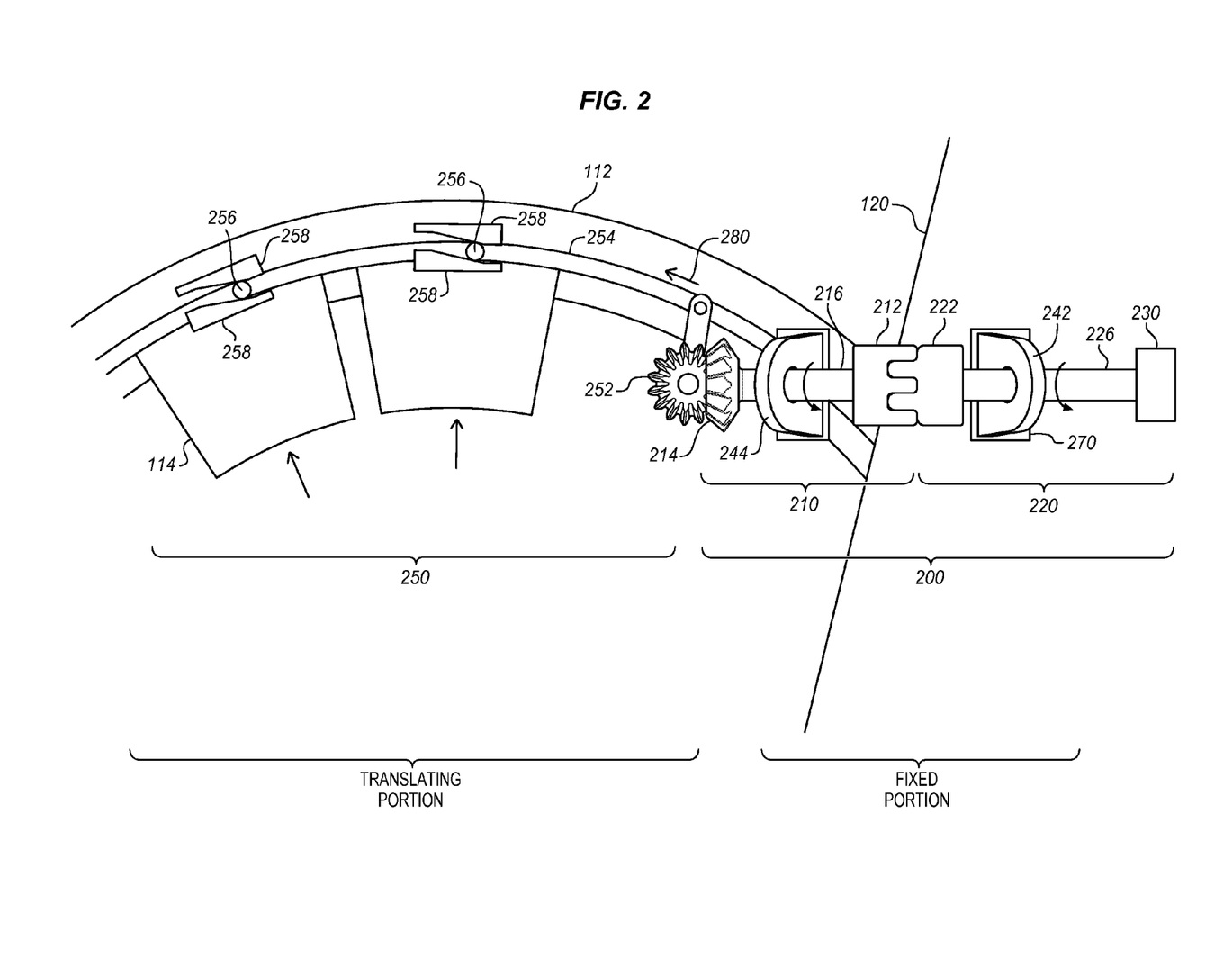
FIG. 2 is a cut-away back view of an engine nacelle that includes a disengageable coupling in one example of the present disclosure.

FIG. 2 is a cut-away back view of an engine nacelle, simplified for illustrative purposes, that includes a disengageable coupling 200 according to one embodiment of the present disclosure. The coupling actuates a Variable Area Fan Nozzle (VAFN) 114, and includes a first coupling member 220 as well as a second coupling member 210. Coupling member 210 is attached to transcowl 112 via bearing 244, while coupling member 220 is attached to a fixed structure of the aircraft that is proximate to the TRAS. In the example shown in FIG. 2, coupling member 220 is attached via bearing 242 to hinge beam 270, which is itself attached to wing pylon 120. In further embodiments, coupling member 220 may be attached to any suitable component that is fixed relative to transcowl 112 (e.g., wing pylon 120, a latch beam, or even the engine itself).

While the coupling members 210, 220 are engaged in a cooperating fit with each other, they serve to actuate VAFN 114, as well as to lock transcowl 112 closed. Similarly, while the coupling members 210, 220 are disengaged, the TRAS may freely open and close transcowl 112 in order to reverse thrust as desired. In this embodiment, when transcowl 112 is closed, the shafts 216 and 226 of coupling members 210 and 220 respectively share an axis of rotation and may be extended, retracted and/or vertically translated with respect to the axis of rotation in order to form the cooperating fit.

Figure 4:
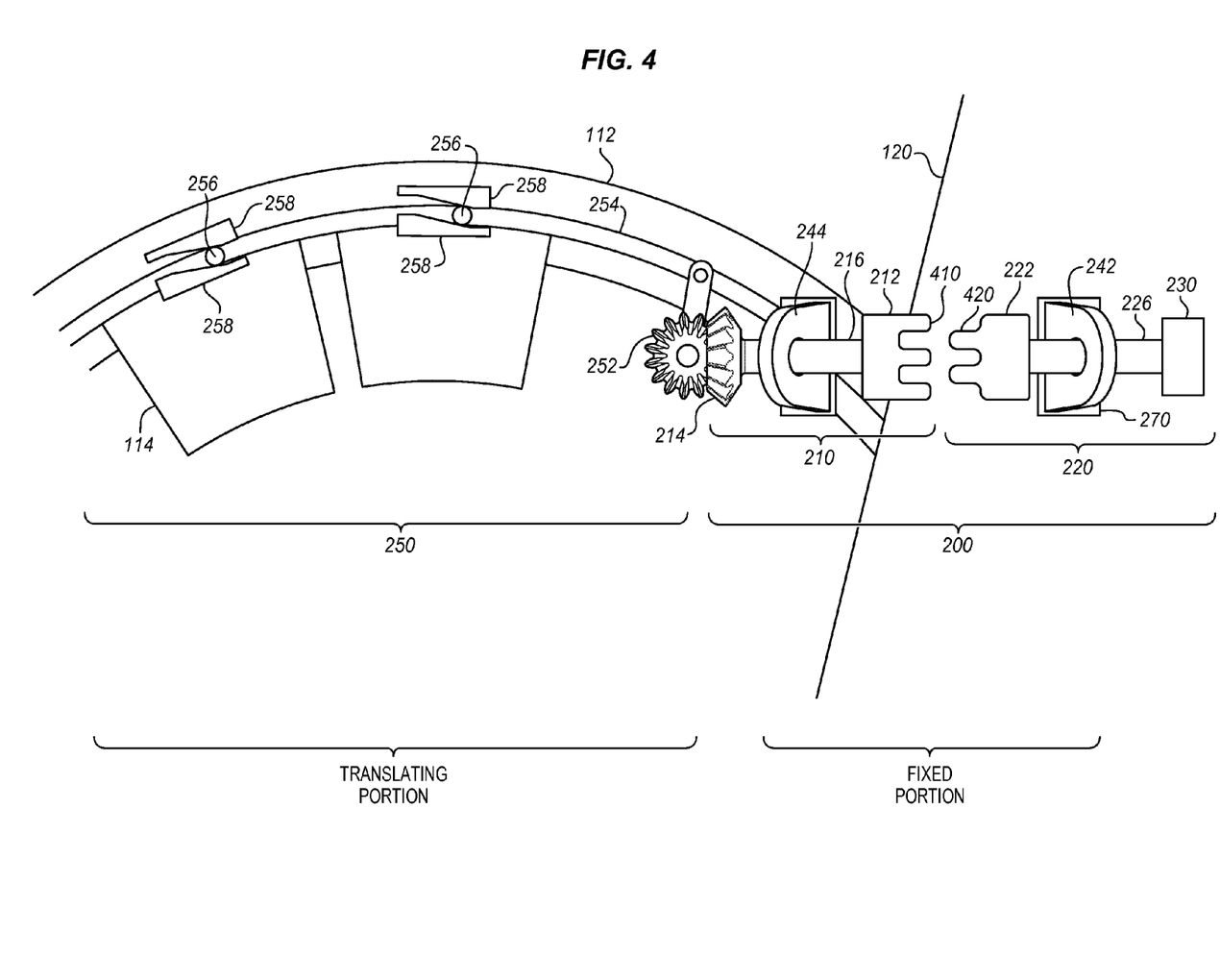
FIG. 4 is a cut-away back view of an engine nacelle that includes a disengaged coupling in one example of the present disclosure.
Figure 5:
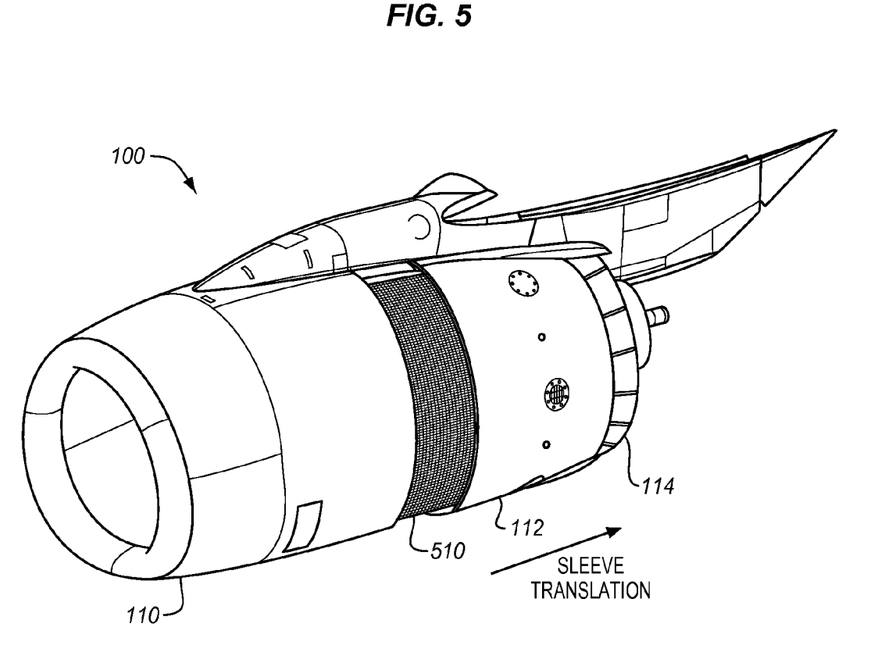
FIG. 5 is a perspective view of an engine nacelle with a translating sleeve thrust reverser that has been moved to an open position in one example of the present disclosure.

In this illustrative example shown in FIG. 2, when transcowl 112 is open (as shown in FIG. 5), coupling member 210 has been moved aftward, meaning that coupling members 210 and 220 are no longer aligned for coupling by extension/retraction because the axis of rotation of coupling member 210 is aftward of the axis of rotation of coupling member 220. In short, coupling member 210 is moved out of the page of FIG. 4 when transcowl 112 is opened, meaning that coupling member 210 is aftward of its original position while coupling member 220 has remained in place.

Coupling members 210 and 220 comprise any suitable arrangement of mechanical components (e.g., gears and shafts) for transferring power from a fixed portion of the aircraft to VAFN 114. Drive system 230 applies torque to shaft 226, which is mechanically interlocked via interlock gear 222 with coupling member 210. Interlock gear 212 of coupling member 210 transfers this torque to shaft 216, causing coupling member 210 to rotate. In this embodiment, coupling member 210 is attached via bearing 244 to a portion of transcowl 112 and may be movable with transcowl 112 relative to fixed structure of the wing (e.g., pylon 120). In this regard, the coupling member 210 may also be referred to as the movable coupling member.

As coupling member 210 rotates, bevel gear 214 drives actuator 250. Actuator 250 adjusts VAFN 114, altering the exit nozzle area of the aircraft engine housed within in nacelle 110. For example, in the embodiment shown in FIG. 2, actuator 250 comprises gear 252, track 254, rollers 256, and ramps 258 of a petal-type VAFN. Track 254 forces rollers 256 across ramps 258 to adjust the position of the petals. Other actuation mechanisms for adjusting the area of the VAFN 114 may be used without departing from the scope of the present disclosure. In some examples, the transmission of power to drive actuator 250 may be accomplished without the use of gears 214 and 252 and may instead be implemented according to other conventional techniques.

While interlock gears 212 and 222 are engaged in a cooperating fit with each other, transcowl 112 is locked/prevented from moving/opening. In some examples, the interlock gears 212 and 222 may be implemented as a Hirth coupling. A Hirth coupling, as may generally be known, may include a pair of shafts coupled together using interlocking teeth which mesh together at the interface between the two shafts. A Hirth coupling may be a suitable implementation as Hirth couplings may generally resist shearing forces that would otherwise act to open transcowl 112 (e.g., shearing forces that would move transcowl 112 out of the page).

In a further embodiment, the movable coupling member may be housed, at least partially, within a mating structure on transcowl 112, and this mating structure may bear against the coupling member itself to provide additional resistance to shearing forces. That is, the body of coupling 200 itself (and not just the interlock gears), may serve to resist induced shearing forces that are caused when transcowl 112 attempts to move. An example including features of this kind is further described with regard to FIG. 7 below. In yet further embodiments, a frictional cooperating fit may be used instead of or in addition to a set of interlocking gears. In examples including a frictional cooperating fit, at least a portion of one of the coupling members may extend into a portion of the other coupling member.

Drive system 230 may include any system, component, or device capable of applying torque to coupling member 220. For example, drive system 230 may comprise an electrical motor, hydraulic motor, pneumatic motor, etc. Actuator 250 may include any systems, components, or devices capable of adjusting the orientation of VAFN 114. For example, actuator 250 may comprise a rotational actuator that adjusts a petal-type VAFN by use of a cable (e.g., as described in U.S. Pre-Grant Patent Publication 2013/0020408), or may use a slider-and-ramp system (e.g., as shown in FIG. 2) to adjust the orientation of VAFN 114. Further components of engine nacelle 110 and/or wing pylon 120 may be used to internally support coupling members 210 and 220. For example, each coupling member may be rotatably supported by one or more bearings or brackets (e.g., bearings 244, 242).

Nacelle 110 provides a benefit over prior systems because it does not require the use of extensible hydraulic hoses to drive VAFN 114, which may be particularly subject to wear and fatigue. Additionally, coupling members 210 and 220 can lock the motion of transcowl 112 during flight, which eliminates the need for an independent transcowl locking system and therefore further reduces weight.

Figure 3:
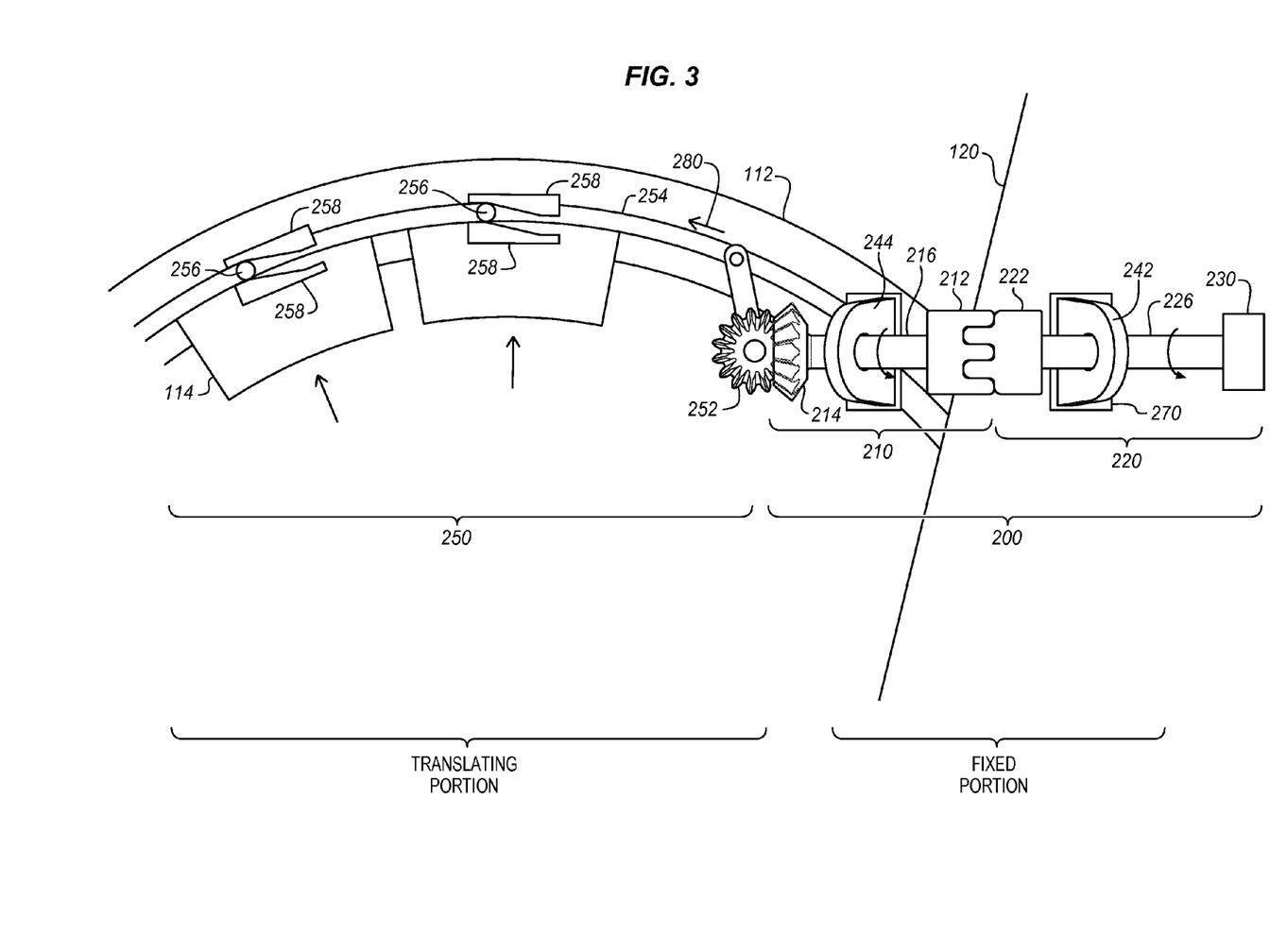
FIG. 3 is an additional cut-away back view of an engine nacelle that includes a disengageable coupling in one example of the present disclosure.

FIG. 3 is an additional simplified cut-away back view of an engine nacelle that includes a disengageable coupling in one example. As illustrated in FIG. 3, track 254 and rollers 256 are movable along ramps 258 by rotation of the shaft 216, which in turn is driven by rotation of shaft 226 transmitted through the disengageable coupling. As the position of track 254 is adjusted in the direction indicated by arrow 280, the motion of rollers 256 along ramps 258 raises the petals of VAFN 114. Adjusting the position of the petals of VAFN 114 in turn adjusts the exit nozzle area of the turbofan engine, for example, by moving at least an aft portion of petals 114 radially inward and/or outward. In the example in FIG. 3, the exit nozzle area is increased in response to movement of actuator 250 in the direction indicated by arrow 280.

FIG. 4 is a cut-away back view, simplified for illustrative purposes, depicting coupling 200 in an embodiment of a disengaged state. According to FIG. 4, coupling member 220 has been disengaged (e.g., retracted away) from coupling member 210. Disengagement of coupling members 210, 220 enables transcowl 112 to move relative to the fixed structure of the wing, such that the transcowl may be placed into an open position as shown in FIG. 5. In the open position internal cascades 510 of the TRAS, which are normally covered by transcowl 112 are visible, as shown in FIG. 5, and a path is provided through the cascades 510 for redirecting flow from the engine in to reverse thrust from the engine.

In some examples, and as illustrated in FIG. 4 interlock gears 212 and 222 may have rounded tooth edges 410 and 420. This feature can provide a benefit by facilitating alignment and/or centering of coupling members 210 and 220 upon engagement of the two (e.g., when transcowl 112 is closed and coupling member 220 is extended back towards coupling member 210 for a cooperating fit).

Illustrative details of the operation of the disengageable coupling of FIGS. 2-5 will be discussed with regard to FIG. 6. Assume, for this embodiment, that an aircraft has just landed, and has used its TRAS during landing. Thus, transcowl 112 is presently open.

Figure 6:
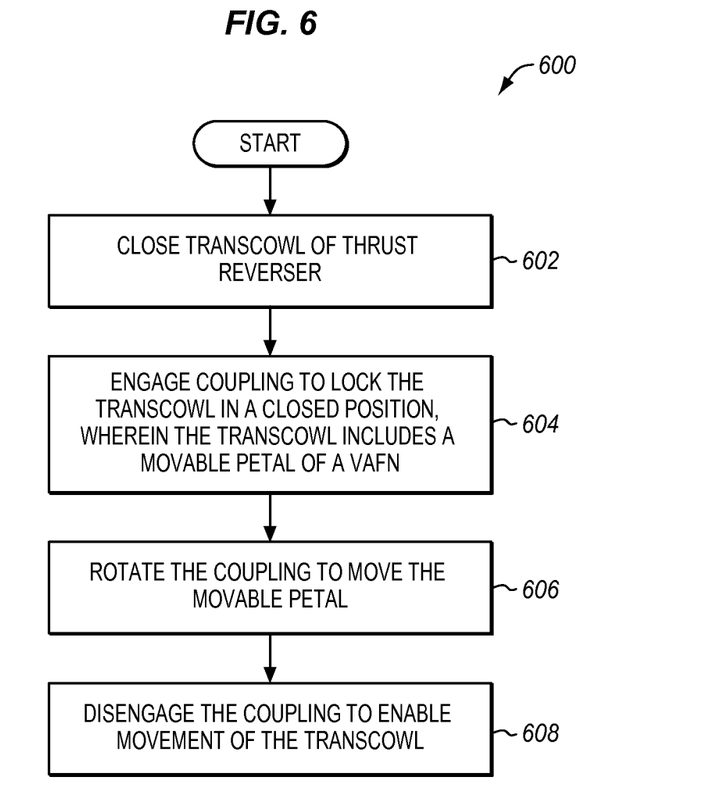
FIG. 6 is a flowchart illustrating a method 600 for operating a disengageable coupling in one example of the present disclosure.

FIG. 6 is a flowchart illustrating a method 600 for operating a disengageable coupling (e.g., coupling 200) in one embodiment according to the present disclosure. The steps of method 600 are described with reference to the disengageable coupling of FIGS. 2-5, but the method 600 is not limited to the embodiments of coupling 200 depicted herein. The steps of the flowcharts described herein are not all inclusive and may include other steps not shown. The steps described herein may also be performed in an alternative order.

In step 602, a control system moves transcowl 112 into a closed position. In step 604, coupling member 220 is extended toward coupling member 210 to engage interlock gear 222 in a cooperating fit with interlock gear 212 of coupling member 210. Coupling member 220 may extend interlock gear 222 by use of hydraulic force, an electric motor, or any suitable mechanism. In some examples, the coupling member 210 may be extended towards coupling member 220 to engage the interlock gears 212 and 222.

The cooperating fit between the interlock gears locks transcowl 112 closed, preventing it from moving. In some examples, by virtue of coupling member 210 being attached to transcowl 112 (e.g., through one or more bearings 242, 244), and since the cooperating fit resists shearing movement, any movement of transcowl 112 with respect to the fixed portion of the aircraft is prevented by coupling member 220 (e.g., any shearing movement with respect to the coupling is prevented by the fit).

In some examples, coupling member 220 may be arranged perpendicular to the sleeve translation direction of transcowl 112 (e.g., the horizontal coupling shown in FIG. 2 may instead be oriented vertically) in order to inhibit movement of transcowl 112. Coupling member 220 and more particularly interlocking gear 222 may thus act as a stopper to the transcowl 112 when the coupling members 210, 220 are engaged.

Figure 7:
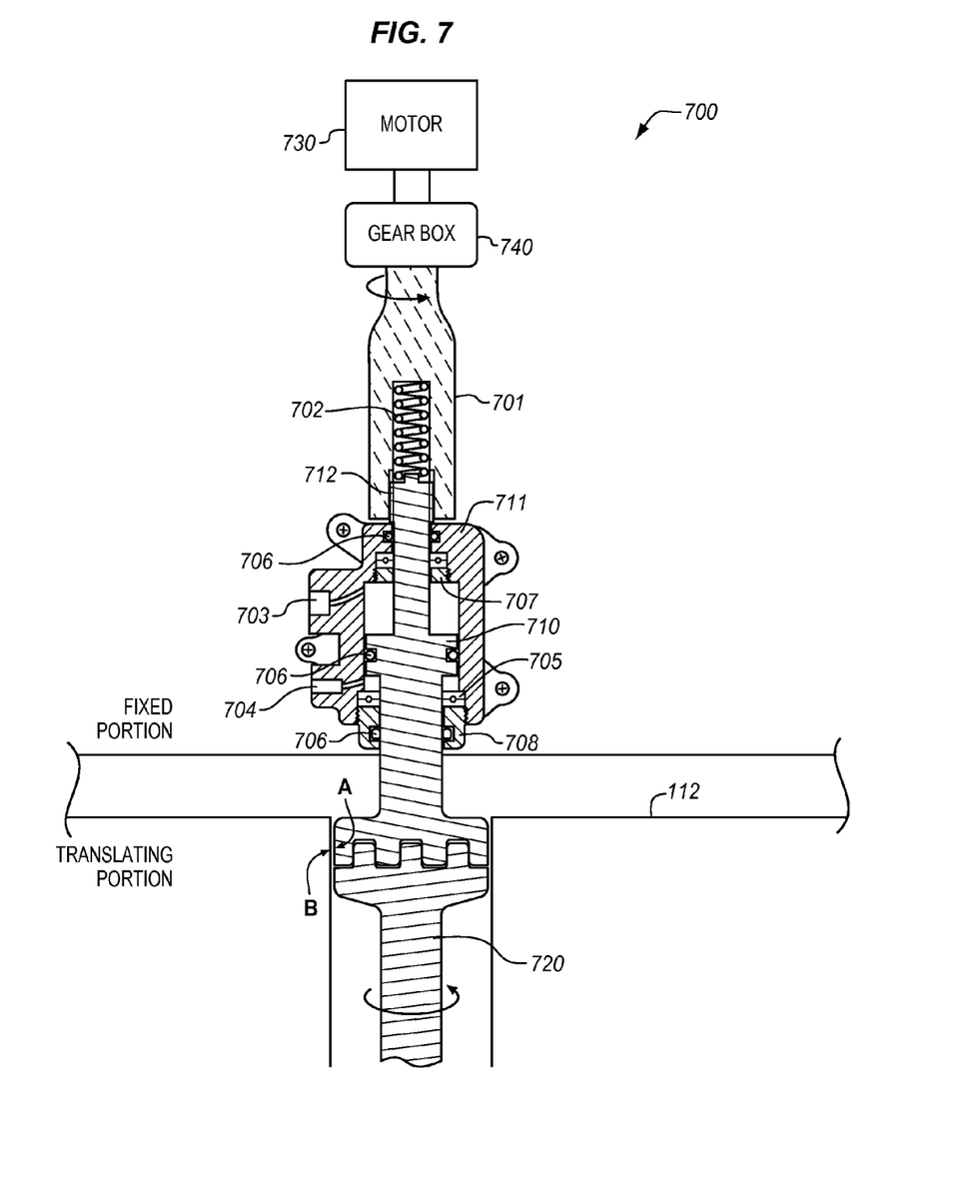
FIG. 7 is a cut-away top view of a disengageable coupling in one example of the present disclosure.

In further examples, a mating structure on transcowl 112 may house the coupling members during their cooperating fit, and this mating structure may direct shearing forces from transcowl 112 to the coupling itself, which resists these forces (as further described with regard to FIG. 7).

Transcowl 112 may be maintained in a closed position while coupling 200 remains engaged (e.g., during flight). During flight (e.g., while transcowl 112 is locked and coupling 200 remains engaged), it may be desirable to move the petals of the VAFN 114 to adjust the exit nozzle area. Coupling 200 may therefore be used to transmit torque to VAFN 114. Accordingly, in step 606, drive system 230 rotates coupling member 220, which in turn drives actuation of VAFN 114, moving the petals of VAFN 114.

After landing, transcowl 112 may again be safe to operate. As such, method 600 may include an optional step 608 of disengaging the coupling to enable movement of transcowl 112.

Method 600 provides a reliable, efficient technique of locking a TRAS, and driving a VAFN using equipment that is light and not subject to the same fatigue problems as, for example, hydraulic hoses. Thus, method 600 provides a substantial benefit over prior systems because it uses an integrated device to perform functions that were assigned to separate components in the past.

In a further embodiment, an electronic control system automatically instructs coupling member 220 to extend interlock gear 222 in response to input from a sensor, such as input indicating that transcowl 112 has closed.

EXAMPLES

In the following examples, additional processes, systems, and methods are described in the context of a coupling for a nacelle of an aircraft. While this example illustrates a coupling that is hydraulically extended/retracted, any suitable extension/retraction mechanism may be used (e.g., pneumatic extension, extension via an electrical solenoid, etc.).

FIG. 7 is a cut-away view illustrating a disengageable coupling 700 in one example of the present disclosure. According to FIG. 7, coupling 700 includes splined housing 701 attached to a hinge beam of an aircraft, which holds piston return spring 702. Piston return spring 702 flexibly extends piston 710 to engage in a cooperating fit with shaft 720 (attached to a transcowl). Housing 701 is attached to hydraulic motor 730 via a gear box 740, which are both attached to the fixed structure of the aircraft and are used to provide rotational motion to piston 710.

Housing 711 includes extend port 703 and retract port 704, which allow hydraulic pressure from a hydraulic source to enter and exit the chamber that holds piston 710 in order to extend/retract piston 710. Housing 711 further includes bearings 705 (which facilitate the rotation of piston 710), hydraulic seals 706, bearing retainer 707, and end gland 708. Housing 711 is fixedly attached to a hinge beam, a latch beam, wing pylon/strut, or other fixed portion of the aircraft.

Shaft 720 is housed on transcowl 112 by similar structures and features to those that house piston 710, but these bearing structures do not include motor coupling arrangements. The structures that house shaft 720 are fixedly attached to transcowl 112. Since the cooperating fit between shaft 720 and piston 710 resists shearing forces, the cooperating fit also locks the transcowl from moving left or right within the page. Note that as shown in FIG. 7, while the piston 710 and shaft 720 are engaged, the coupling itself also resists shearing motions from transcowl 112, because these shearing motions are borne by the surface "A" of piston 710 when the surface "B" of transcowl 112 applies a shearing force to the coupling. Thus the coupling itself and the cooperating fit both help to resist shearing forces from transcowl 112.

An electronic control system may manage the operations of the various hydraulics systems, motors, and other components described herein. Any of the various electronic elements shown in the figures or described herein may be implemented as circuitry, software, firmware, or some combination of these. For example, an element may be implemented as dedicated circuitry. Dedicated circuitry elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

The invention claimed is:

1. A system comprising:
a fan nozzle drive system that locks a thrust reverser of an aircraft, the drive system comprising:
    a first coupling member attached to a first structure proximate to the thrust reverser; and
    a second coupling member attached to a translating portion of the thrust reverser, the translating portion configured to move relative to the first structure;
    wherein the first coupling member and the second coupling member are configured to engage via motion in a direction perpendicular to a direction of translation of the translating portion;
    wherein engagement of the first coupling member and the second coupling member is performed while the first coupling member and the second coupling member are aligned axially with each other, and locks the translating portion in place, preventing deployment of and movement of the translating portion in the direction of translation; and
    while movement of the translating portion is prevented by the first and second coupling member, the second coupling member is configured to transmit rotation from the first coupling member to an actuator configured to drive at least a portion of a Variable Area Fan Nozzle (VAFN) located on the translating portion, thereby altering an area of an exit nozzle defined by the VAFN.

2. The system of claim 1, wherein:
the first coupling member and the second coupling member each comprise a gear, and the gears are configured to interlock with each other in a cooperating fit.

3. The system of claim 2, wherein:
the gears include rounded tooth edges.

4. The system of claim 2, wherein:
teeth of the gears are configured to protrude into each other to form a Hirth coupling.

5. The system of claim 1, wherein:
the first coupling member and the second coupling member each include a shaft, wherein the shafts are configured to rotate about a shared axis while the first and second coupling members are engaged.

6. The system of claim 1, wherein:
the first coupling member is attached to a hinge beam of the aircraft.

7. The system of claim 1, wherein:
the first coupling member is attached to a latch beam of the aircraft.

8. The system of claim 1, wherein:
the first coupling member is attached to a turbofan engine of the aircraft.

9. The system of claim 1, wherein:
the VAFN is a petal-type VAFN.

10. The system of claim 1, wherein:
the first coupling member includes a retractable portion configured for cooperating fit with the second coupling member, and
the first coupling member is configured to disengage from the second coupling member by retracting the retractable portion.

11. The system of claim 1, wherein:
the first coupling member and the second coupling member are configured to engage with each other to form a frictional cooperating fit.

12. The system of claim 1, further comprising:
a bevel gear coupled to the second coupling member, the bevel gear configured to drive a rotary actuator for the VAFN.

13. A system comprising:
a fan nozzle drive system that locks a thrust reverser of an aircraft, the drive system comprising:
    a coupling configured to selectively engage and disengage first and second coupling members, via motion in a direction perpendicular to a direction of translation of a translating portion of a thrust reverser of an aircraft, wherein:
    while engaged, the first and second coupling members are axially aligned with each other, and the coupling is configured to rotate to drive a Variable Area Fan Nozzle (VAFN), thereby altering an area of an exit nozzle defined by the VAFN, wherein
    at least a portion of the coupling is on a translating portion of the thrust reverser and
    while engaged, the coupling locks the translating portion in place, preventing movement of the translating portion.

14. The system of claim 13, wherein:
the first coupling member and the second coupling member are configured for cooperating fit with each other, wherein the second coupling member is attached to the translating portion of the thrust reverser, and the first coupling member is attached to a portion of the aircraft that is fixed with respect to the translating portion.

15. The system of claim 14, wherein:
the first coupling member is attached to a hinge beam or a latch beam of the aircraft.

16. The system of claim 14, wherein:
the first coupling member is arranged perpendicular to a direction of motion of the translating portion, the first coupling member configured to inhibit movement of the translating portion when the first coupling member is engaged with the second coupling member, by resisting shear forces applied to the first coupling member when the translating portion attempts to move.

17. The system of claim 14, wherein:
the first coupling member is configured to disengage from the second coupling member by retracting.

18. The system of claim 14, wherein:
the first coupling member and the second coupling member are configured to protrude into each other to form a Hirth coupling.

19. A method of operating a Variable Area Fan Nozzle (VAFN) located on a transcowl of an aircraft, the method comprising:
   closing a transcowl of a thrust reverser of an aircraft;
   engaging a coupling of a fan nozzle drive system by engaging first and second coupling members via motion in a direction perpendicular to a direction of translation of the transcowl, thereby locking the transcowl in place in a closed position, wherein the transcowl includes a movable petal of a VAFN;
   while engaged, the coupling locks the translating portion in place, preventing deployment of and movement of the translating portion in the direction of translation, and
   rotating the coupling to move the movable petal while the coupling is engaged, thereby altering an area of an exit nozzle defined by the VAFN.

20. The method of claim 19, further comprising:
   disengaging the coupling to enable movement of the transcowl.

21. An apparatus comprising:
   a fan nozzle drive system that locks a thrust reverser of an aircraft, the drive system comprising:
      a motor; and
      a coupling that comprises:
         a first interlock gear coupled to the motor; and
         a second interlock gear coupled to a Variable Area Fan Nozzle (VAFN),
   wherein:
      in a first mode of operation, the first and second interlock gears are axially aligned and engaged with each other to enable the motor to apply torque to the coupling in a manner that drives the VAFN, while the coupling locks a translating portion of the thrust reverser in place, preventing deployment and movement of the translating portion in a direction of translation of the translating portion, and
      in a second mode of operation the first and second interlock gears are disengaged to allow the thrust reverser to move,
      wherein the first coupling member and the second coupling member are configured to engage via motion in a direction perpendicular to the direction of translation of the translating portion.

22. The apparatus of claim 21 wherein:
   in the first mode of operation the motor is configured to drive the VAFN by applying torque that displaces a track within the VAFN.

23. The apparatus of claim 22 wherein:
   the track includes multiple rollers that each correspond to a petal of the VAFN, and torque applied by the motor causes each of the rollers to change position by moving along a ramp, resulting in a change of position of a corresponding petal of the VAFN.

* * * * *